(12) United States Patent
Ochiai

(10) Patent No.: US 9,961,888 B2
(45) Date of Patent: May 8, 2018

(54) LINE ROLLER

(71) Applicant: Shimano Inc., Sakai, Osaka (JP)

(72) Inventor: Koji Ochiai, Osaka (JP)

(73) Assignee: Shimano Inc., Osaka (JP)

( * ) Notice: Subject to any disclaimer, the term of this patent is extended or adjusted under 35 U.S.C. 154(b) by 0 days. days.

(21) Appl. No.: 15/288,948

(22) Filed: Oct. 7, 2016

(65) Prior Publication Data

US 2017/0181419 A1    Jun. 29, 2017

(30) Foreign Application Priority Data

Dec. 25, 2015   (JP) .................................. 2015-253140

(51) Int. Cl.
*A01K 89/01*   (2006.01)

(52) U.S. Cl.
CPC .. *A01K 89/011222* (2015.05); *A01K 89/0108* (2013.01); *A01K 89/011221* (2015.05); *A01K 89/011223* (2015.05)

(58) Field of Classification Search
CPC .............. A01K 89/01; A01K 89/01081; A01K 89/011221; A01K 89/011222; A01K 89/011223
See application file for complete search history.

(56) References Cited

U.S. PATENT DOCUMENTS

| 3,602,559 A * | 8/1971 | Hirschler | F16C 33/6618 277/420 |
| 4,402,515 A * | 9/1983 | Malott | F01D 11/02 277/415 |
| 4,576,383 A * | 3/1986 | Ballard | F16J 15/4472 277/416 |
| 5,499,901 A * | 3/1996 | Rockwood | F04D 29/061 277/412 |
| 6,010,314 A * | 1/2000 | Kobayashi | F04B 27/109 417/222.2 |
| 6,227,474 B1 * | 5/2001 | Okada | A01K 89/0108 242/150 R |
| 6,843,482 B1 * | 1/2005 | Bayne | F16J 15/002 277/412 |

(Continued)

FOREIGN PATENT DOCUMENTS

| EP | 2 904 900 A1 | 8/2015 |
| JP | 2002-238410 A | 8/2002 |

(Continued)

OTHER PUBLICATIONS

European Search Report of corresponding EP patent Application No. 16 20 4668.4 dated May 12, 2017.

*Primary Examiner* — Emmanuel M Marcelo
(74) *Attorney, Agent, or Firm* — Global IP Counselors, LLP

(57) ABSTRACT

A line roller includes a cylindrical guide member including a guide surface on an outer perimeter for guiding a fishing line, an axle bearing member rotatably supporting an inner perimeter surface of the guide member, and a support member supporting the axle bearing member. The axle bearing member includes an inner ring supported by the support member, an outer ring integrally rotatable with the guide member, a rolling body disposed between the inner ring and the outer ring, and a grease holding unit holding water-repellent grease between the inner ring and the outer ring.

15 Claims, 9 Drawing Sheets

(56) References Cited

U.S. PATENT DOCUMENTS

| | | | | |
|---|---|---|---|---|
| 2009/0127795 | A1* | 5/2009 | Lattime | F16C 33/7813 |
| | | | | 277/412 |
| 2013/0206889 | A1* | 8/2013 | Ochiai | A01K 89/00 |
| | | | | 242/322 |
| 2013/0322803 | A1* | 12/2013 | Gruber | F16C 23/086 |
| | | | | 384/477 |
| 2014/0159318 | A1* | 6/2014 | Lattime | F16J 15/3256 |
| | | | | 277/412 |
| 2014/0312153 | A1* | 10/2014 | Hiraoka | A01K 89/0108 |
| | | | | 242/234 |

FOREIGN PATENT DOCUMENTS

| | | |
|---|---|---|
| JP | 2003-148497 A | 5/2003 |
| JP | 2004-290153 A | 10/2004 |
| JP | 2006-101704 A | 4/2006 |

\* cited by examiner

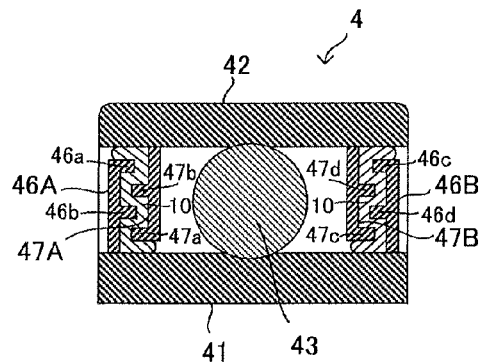
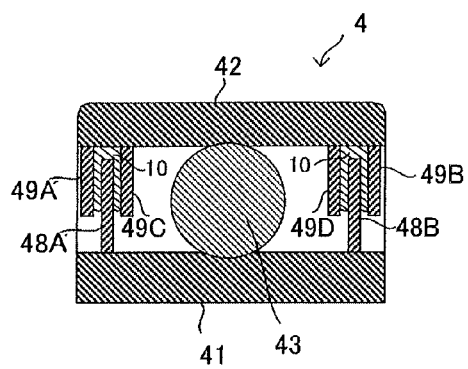
FIG. 7A  FIG. 7B
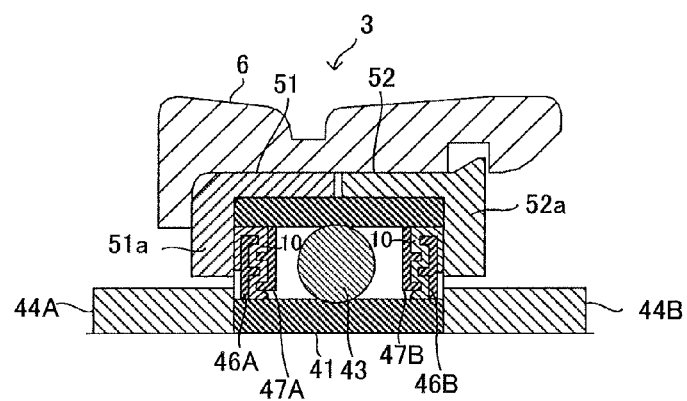
FIG. 8A
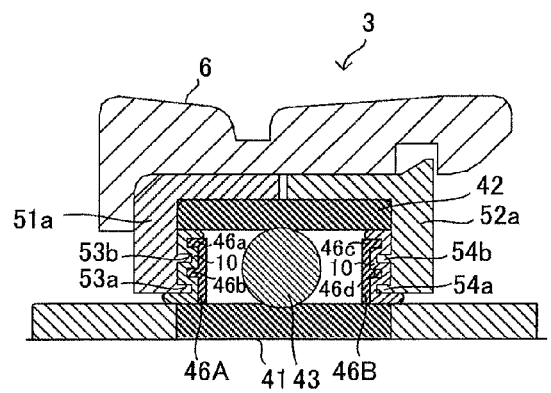
FIG. 8B

LINE ROLLER

CROSS-REFERENCE TO RELATED APPLICATIONS

This application claims priority based on Japanese Patent Application No. 2015-253140, filed in the Japan Patent Office on Dec. 25, 2015, the contents of which are hereby incorporated herein by reference.

BACKGROUND

Field of the Invention

The present invention relates to a line roller of a spinning reel for fishing.

Background Information

A spinning reel for fishing comprises a spool, a rotor comprising a pair of rotor arms, and a fishing line guiding mechanism (the so-called "bail arm") pivotably mounted to the distal end of the pair of rotor arms (for example, see Japanese Published Unexamined Application. No. 2006-101704). The fishing line guiding mechanism is a mechanism for guiding the fishing line to the spool. The fishing line guiding mechanism comprises a bail, a pair of bail support members that support two ends of the bail, and a line roller.

A line roller, in general, comprises a guide member and an axle bearing member, such as a bearing. The guide member is rotatably mounted to the axle bearing member. Since the line, roller is used in an environment that easily comes into contact with seawater and the like, seawater, etc., is likely to enter the inside of the axle bearing member. When seawater, etc., enters inside the axle be member, solidification of the salt and rust can occur, which reduces the function of the axle bearing member. Therefore, there are inventions in which water-repellent grease is included inside the axle bearing in order to prevent seawater, etc., from entering inside the rolling bearing of the fishing reel (for example, see Japanese Published Unexamined Application No. 2004-290153). Further, there are inventions in which a contact or non-contact sealing structure is disposed on the rolling bearing, in which is included the lubricating grease (for example, see Japanese Published Unexamined Application No. 2003-148497).

SUMMARY

In the axle bearing member disclosed in the Japanese Published Unexamined Application No. 2004-290153, a seal is disposed on both sides of the axle bearing member to prevent the water-repellent grease from flowing to the outside. However, since there is a gap between the end of the seal and the axle bearing member, it is possible for the water-repellent grease to flow out through the gap due to the centrifugal force that is applied to the line roller. Once the water-repellent grease flows out, seawater, etc., can easily penetrate into the interior of the axle bearing member.

A concavo-convex labyrinth can be formed by opposing planes of sealing plates in the axle bearing, as disclosed in Japanese Published Unexamined Application No. 2003-148497, to prevent the intrusion of foreign matter (to improve dust resistance). However, while it is possible to prevent the intrusion of foreign matter to a certain degree, since a lubricating grease is used in this kind of axle bearing, the waterproofing property is insufficient against seawater, etc. Accordingly, a line roller having an axle bearing member that does not easily let seawater, etc., penetrate to the inside of the axle bearing member is desired.

The present invention was made to solve the problem described above, and an object thereof is to provide a line roller comprising an axle bearing member with a structure in which seawater, etc., cannot easily penetrate inside.

(1) The line roller according to the present invention is a line roller for guiding a fishing line to a spool of a spinning reel for fishing, comprising a cylindrical guide member comprising a guide surface on an outer perimeter for guiding the fishing line, an axle bearing member rotatably supporting an inner perimeter surface of the guide member, and a support member supporting the axle bearing member. The axle bearing member comprises an inner ring supported by the support member, an outer ring integrally rotated with the guide member, a rolling body disposed between the inner ring and the outer ring, and a grease holding unit that holds water-repellent grease between the inner ring and the outer ring.

(2) Preferably, the grease holding unit comprises a first grease holding unit forming portion that protrudes radially outwardly from the inner ring, and a second grease holding unit forming portion that protrudes radially inwardly from the outer ring, and that has a side surface that opposes a side surface of the first grease holding unit forming portion, such that the water-repellent grease is held between a side surface of the first grease holding unit forming portion and a side surface of the second grease holding unit forming portion.

(3) Preferably, the grease holding unit is formed such that the side surface of the first grease holding unit forming portion and the side surface of the second grease holding unit forming portion are opposed and bent in a complementary manner.

(4) Preferably, the grease holding unit is confi formed gured such that the second grease holding unit forming portion comprises a recess, the first grease holding unit forming portion is inserted in the recess leaving a gap, and the water-repellent grease is held in the gap.

(5) Preferably, the line roller further comprises a holding member between the guide member and the outer ring that connects the guide member and the outer ring, and a portion of the holding member also serves as the second grease holding unit forming portion.

(6) Preferably, the line roller further comprises an external grease holding unit that configures a space leading from the axle bearing member to the guide member, and that holds the water-repellent grease in the space.

(7) Preferably, the external grease holding unit comprises a seal member made of an elastic member that is disposed between the guide member and the support member.

(8) Preferably, the seal member comprises a fixed portion that is fixed to one of the guide member and the support member, and a lip portion that extends from the fixed portion toward the other member and in which a thickness of a distal end portion is thinner than a thickness of a fixed portion.

(9) Preferably, the external grease holding unit comprises a first annular protruding member having an annular protrusion that projects in an axial direction or a radial direction of the rotation of the axle bearing member, and a second annular protruding member having an annular protrusion that projects adjacent in a direction that opposes the annular protrusion.

(10) Preferably, the external grease holding unit comprises an annular protruding member having an annular protrusion that projects in an axial direction or a radial direction of the rotation of the axle bearing member, and an annular recessed member having an annular recess that is recessed complementary to the annular protrusion.

(11) Preferably, the water-repellent grease is held in at least a portion of the space that leads to the guide member and one outer end surface of the axle bearing member in the rotary support shaft direction.

(12) Preferably, the water-repellent grease is also filled inside the axle bearing member.

(13) Preferably, water-repellent grease that is different from the water-repellent grease described above is filled inside the axle bearing member.

(14) Preferably, the line roller comprises an external grease holding unit that configures a space leading from the axle bearing member to the guide member and that holds water-repellent grease in the space, and a portion of the holding member configures a portion of the external grease holding unit.

According to the present invention, it is possible to provide a line roller comprising an axle bearing member with a structure in which seawater, etc., cannot, easily penetrate inside.

BRIEF DESCRIPTION OF THE DRAWINGS

Referring now to the attached drawings which form a part of this original disclosure.

FIG. 7A is a cross-sectional view of an axle bearing member according to a first modified example of the present invention; and FIG. 7B is a cross-sectional view of the axle bearing member according to a second modified example.

FIG. 8A is a cross-sectional view of an axle bearing member according to a third modified example of the present invention; and FIG. 8B is a cross-sectional view of the axle bearing member according to a fourth modified example.

DETAILED DESCRIPTION OF THE EMBODIMENTS

First Embodiment

The spinning reel for fishing and the line roller used therefor according to the first embodiment of the present invention will be described with reference to the drawings. In the following description, "front" indicates the direction in which the fishing line is unreeled; specifically, the left in FIG. 1 and FIG. 2 is the "front." In addition, the material of each member is not limited to the examples; well-known materials having the necessary function and durability may be appropriately used.

Figure 1:
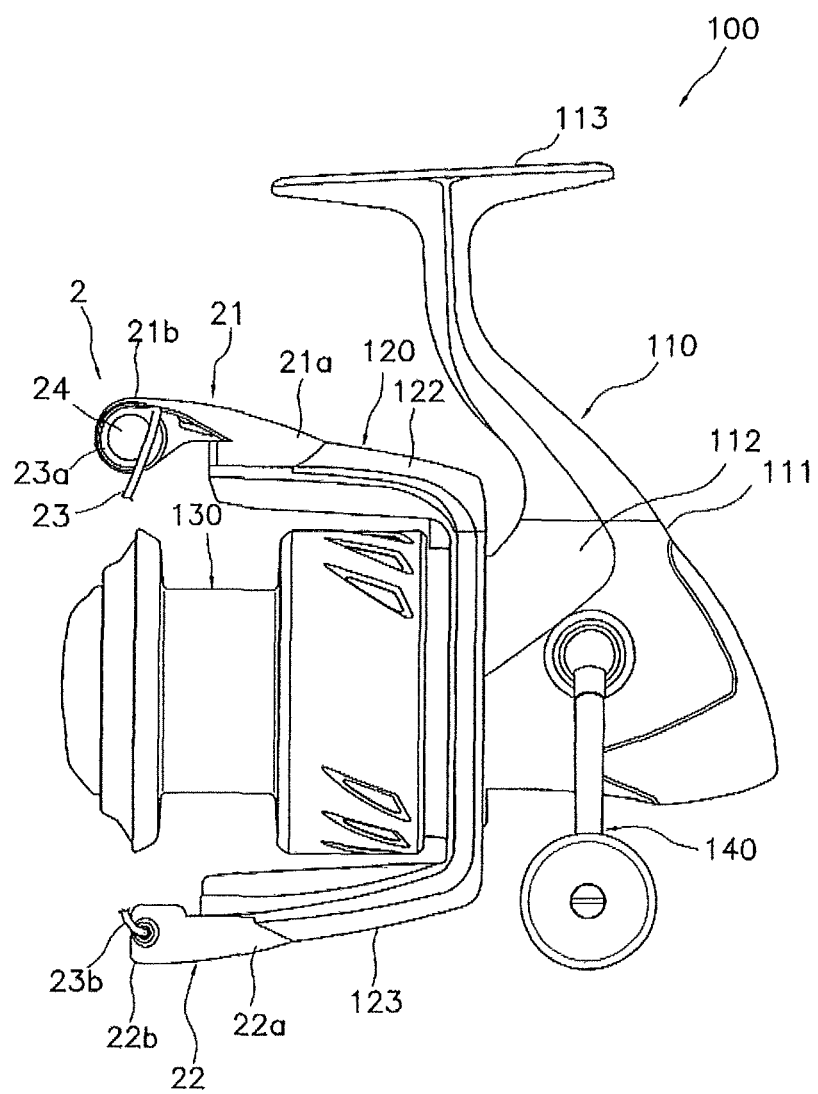
FIG. 1 is an overall view of a spinning reel for fishing according to a first embodiment of the present invention.

As shown in FIG. 1, the spinning reel for fishing 100 comprises a reel body 110, a rotor 120, a spool 130, a handle 140, and a fishing line guiding mechanism 2. Further, as shown in FIG. 2, the spinning reel for fishing 100 further comprises a drive mechanism 150, an oscillating mechanism 160, a pinion gear 170, and a spool shaft 180.

As shown in FIG. 1, the reel body 110 comprises a case part 111 and a lid portion 112. The lid portion 112 can be detached from the case part 111. Further, the case part 111 comprises a, mounting portion 113 that extends in a longitudinal direction. The mounting portion 113 is a portion that is mounted to a fishing rod.

Figure 2:
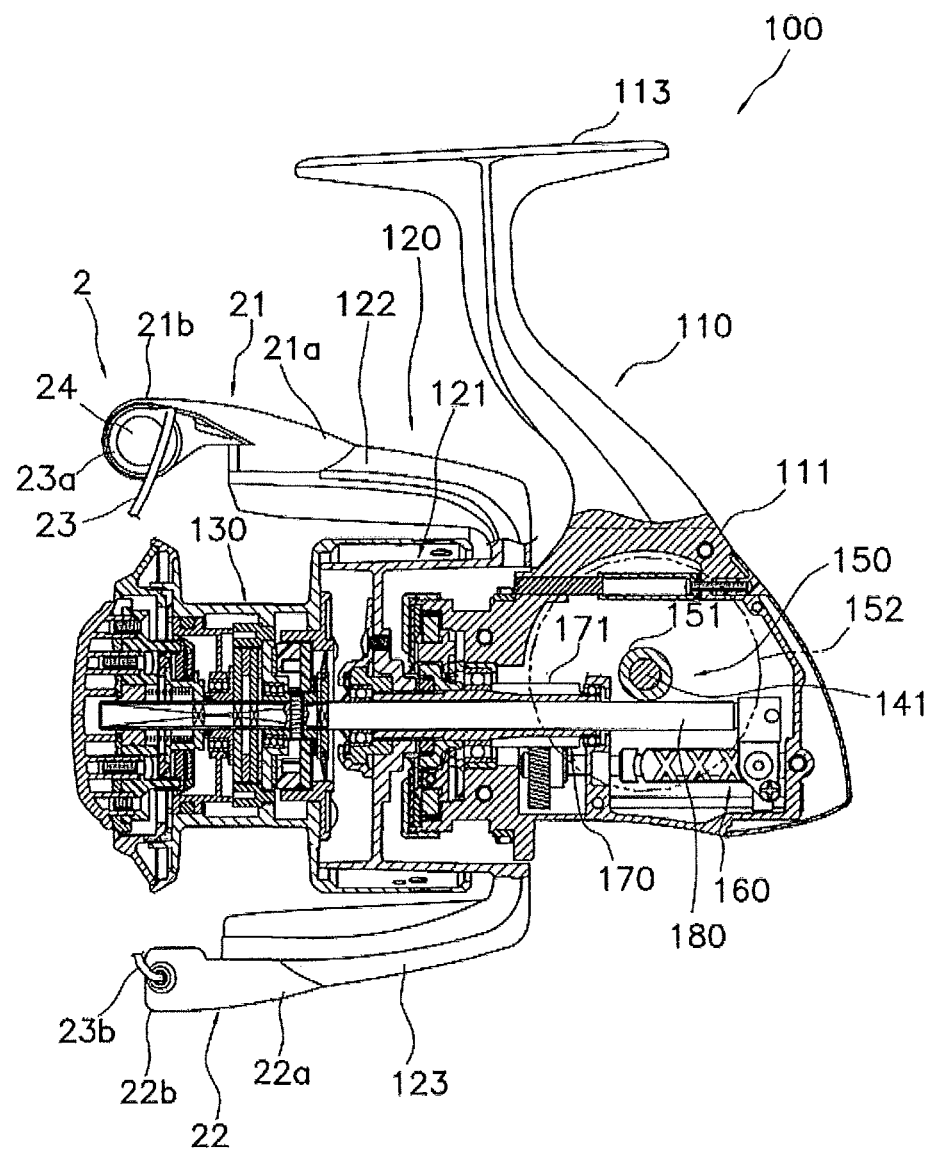
FIG. 2 is a cross-sectional view of the spinning reel for fishing shown in FIG. 1.

As shown in FIG. 2, the reel body 110 comprises an internal space that is defined by the case part 111 and the lid portion 112, which houses various mechanisms. In particular, the drive mechanism 150 and the oscillating mechanism 160 are housed in the reel body 110.

The drive mechanism 150 comprises a drive shaft 151 and a drive gear 152. The drive shaft 151 is coupled with a handle shaft 141 and is integrally rotated with the handle shaft 141.

The drive gear 152 is coupled with the drive shaft 151, and is integrally rotated with the drive shaft 151. The drive gear 152 is a face gear and meshes with the gear portion 171 of the pinion gear 170. The drive shaft 151 and the drive gear 152 are rotated by rotating the handle 140 that is mounted to the side surface, of the reel body 110, and the pinion gear 170 is also rotated.

The pinion gear 170 is disposed in the reel body 110. In particular, the pinion gear 170 extends forwardly from inside the reel body 110. The pinion gear 170 is rotatably disposed around the spool shaft 180. The pinion gear 170 is formed in a tubular shape and the spool shaft 180 extends inside the pinion gear 170. The pinion gear 170 is supported in the reel body 110 via a plurality of axle bearing members.

The spool shaft 180 extends forwardly from inside the reel body 110. The spool shaft 180 is reciprocated in the longitudinal direction by rotating the handle 140. In particular, the rotation of the handle 140 rotates the pinion gear 170 via the drive gear 152. Accompanying the rotation of this pinion gear 170, the oscillating mechanism 160 reciprocates the spool shaft 180 in the longitudinal direction.

The spool 130 is a member on which the fishing line is wound. The spool 130 is supported on the distal end portion of the spool shaft 180. The spool 130 is integrally reciprocated with the spool shaft 180 in the longitudinal direction.

The rotor 120 is a member for winding the fishing line on the spool 130. The rotor 120 is fixed to a front portion of the pinion gear 170, and is integrally rotated with the pinion gear 170. Therefore, the rotor 120 is non-rotatable relative to the pinion gear 170.

The rotor 120 comprises a rotor body 121, a first rotor arm 122, and a second rotor arm 123. The rotor body 121 has a cylindrical shape. The first rotor arm 122 and the second rotor arm 123 extend from the outer perimeter surface of the rotor body 121 toward the front. The first rotor arm 122 and the second rotor arm 123 are disposed in opposite positions in the circumferential direction of the rotor body 121.

Figure 3:
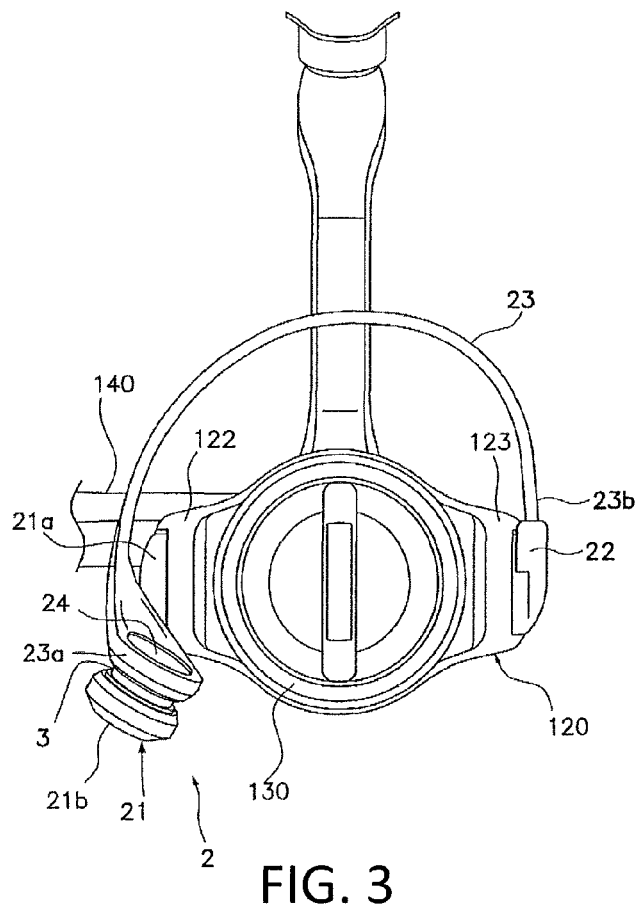
FIG. 3 is a front view of the spinning reel for fishing shown in FIG. 1.

FIG. 3 is a front view of a spinning reel. As shown in FIGS. 1-3, the fishing line guiding mechanism 2 is a mechanism to guide the fishing line to the spool 130. The fishing line guiding mechanism 2 is attached to the distal end portions of the first rotor arm 122 and the second rotor arm 123.

The fishing line guiding mechanism 2 is pivotably mounted to assume the line guiding position and the line releasing position. The fishing line guiding mechanism 2 comprises a first bail support member 21 and a second bail support member 22, a bail 23, a support shaft (support member) 24, and a line roller 3.

The first bail support member 21 is pivotably mounted to the first rotor arm 122. Specifically, the first bail support member 21 is pivotably mounted to the outside of the distal end portion of the first rotor arm 122.

The second bail support member 22 is pivotably mounted to the second rotor arm 123. Specifically, the second bail support member 22 is pivotably mounted to the outside of the distal end portion of the second rotor arm 123.

Figure 4:
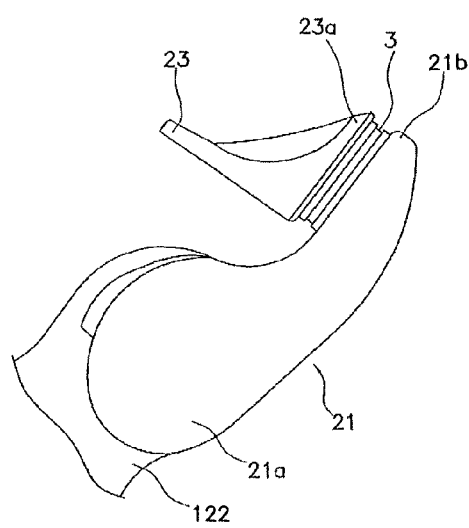
FIG. 4 is an enlarged, partial view of the fishing line guiding mechanism of the spinning reel for fishing shown in FIG. 1.

FIG. 4 is a partial, enlarged view of the fishing line guiding mechanism 2. As shown in FIG. 4, the first bail support member 21 comprises a first end portion 21a and a second end portion 21b. The first end portion 21a is pivotably mounted to the first rotor arm 122. The second end portion 21b of the first bail support member 21 supports the first end portion 23a of the bail 23 via the support shaft 24 (refer to FIG. 5).

As shown in FIG. 1 and FIG. 2, the second bail support member 22 comprises a first end portion 22a and a second end portion 22b.

The first end portion 22a is pivotally mounted to the second rotor arm 123. The second end portion 22b supports the second end portion 23b of the bail 23.

As shown in FIG. 3, the bail 23 is a member curved in a substantially U-shape and made of stainless steel alloy. The bail 23 is curved to protrude outwards along the outer perimeter surface of the spool 130. This bail 23 comprises a cover portion 23a at the first end portion.

The cover portion 23a is supported on the first bail support member 21 via the support shaft 24. Further, the second end portion 23b of the bail 23 is supported on the second bail support member 22. When the fishing line guiding mechanism 2 returns to the line guiding position from the line releasing, position, the bail 23 guides the fishing lace to the line roller 3 via the cover portion 23a. The line roller 3 is a member for guiding the fishing line to the spool 130 of the spinning reel for fishing 100.

Figure 5:
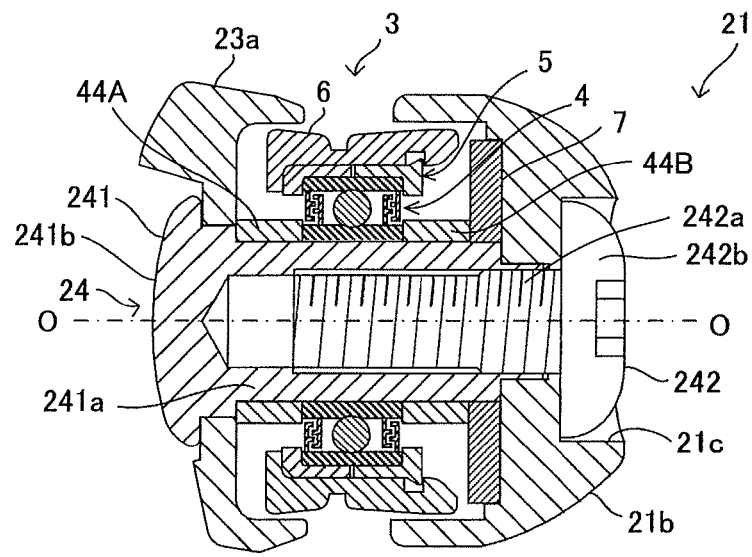
FIG. 5 is a partial, cross-sectional view of the fishing line guiding mechanism of the spinning reel for fishing shown in FIG. 1.

FIG. 5 is a partial cross-sectional view of the fishing line guiding mechanism 2 comprising the line roller 3. The line roller 3 is formed such that the guide member 6 is rotatably supported around the support shaft 24 along with the holding member 5, by the axle bearing member 4, with respect to the stationary support shaft 24. The fishing line is guided to the spool 130 by the rotating guide member 6. Meanwhile, in the following explanation, the axial direction means the direction in which the rotational axis O of the line roller 3 (axle bearing member 4) extends. That is, the axial direction means the direction in which the supporting shaft 24 extends, and in FIG. 5, the left and right direction is the axial direction. Further, the radial direction means the radial direction of a circle centered on the rotational axis O. In addition, the circumferential direction means the circumferential direction of a circle centered on the rotational axis O.

As shown in FIG. 5, a through-hole 21c is formed at the second end portion 21b of the first bail support member 21. The through-hole 21c is a stepped through-hole. A support shaft 24 extends through this through-hole 21c.

The support shaft 24 extends between the first bail support member 21 and the cover portion 23a of the bail 21. The support shaft 24 comprises a tubular portion 241 and a bolt portion 242. The tubular portion 241 comprises a shaft portion 241a and a head portion 241b. The shaft portion 241a is a cylindrical shape and a female threaded portion is formed on the inner perimeter surface. The head portion 241b has a larger diameter than the shaft portion 241a. With the head portion 241b abutting the Cover portion 23a, the movement of the tubular portion 241 in the axial direction is regulated.

The bolt portion 242 comprises a shaft portion 242a and a head portion 242b. The shaft portion 242a has a cylindrical shape and a male threaded portion is formed on the outer perimeter surface. Accordingly, the bolt portion 242 screws into the tubular portion 241. The head portion 242b has a larger diameter than the shaft portion 242a. With the head portion 242b abutting the second end portion 21b of the first bail support member 21, the movement of the bolt portion 242 in the axial direction is regulated.

As shown in FIG. 5, the line roller 3 comprises an axle bearing member 4, a holding member (collar member) 5, and a guide member 6. In addition, the line roller 3 comprises a regulating member 44A, a regulating member 44B, and a regulating member 7. Meanwhile, the line roller 3 is formed in an annular shape centered on the axis O, and is vertically symmetrical relative to the axis O on a cross-sectional view that is parallel to the axis O, as shown in FIG. 5; therefore, in FIG. 6 and below, reference symbols are provided to the upper half of the axis O in the following description. In addition, there are cases in which the right direction or the left direction in the figure is referred to as axially outward. The same applies to the following cross-sectional view.

The axle bearing member 4 is abutted by the regulating member 44A from the left side in FIG. 5, and abutted by the regulating member 44B from the right side in FIG. 5. The regulating member 44B is further abutted by the regulating member 7 from the right side. In this manner, the position of the axle bearing member 4 is regulated by the regulating member 44A, the regulating member 44B, and the regulating member 7.

Figure 6:
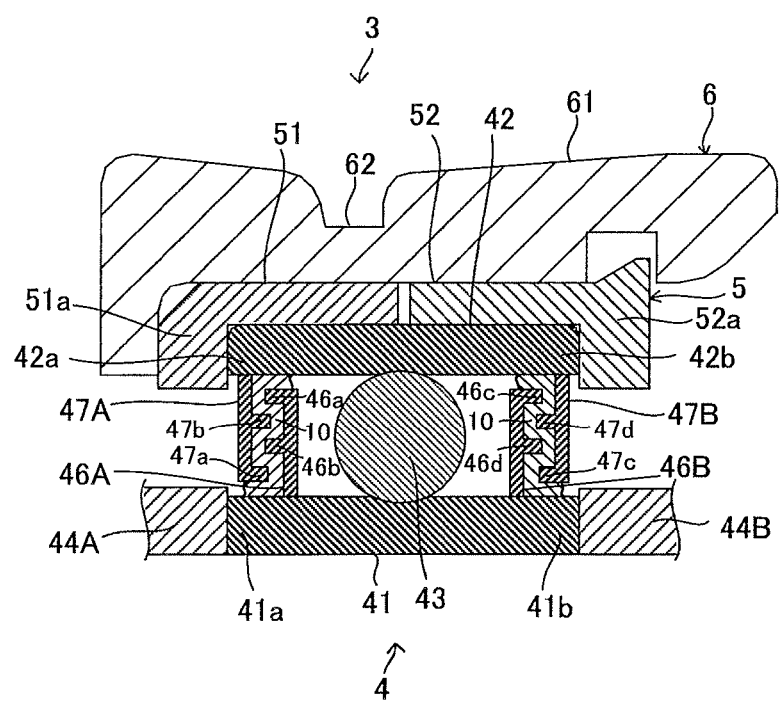
FIG. 6 is a cross-sectional view of a line roller of the spinning reel for fishing shown in FIG. 1.

As shown in FIG. 6, the axle bearing member 4 comprises an inner ring 41, an outer ring 42, and a plurality of rolling bodies 43; a lubricating oil (lubricating grease) is appropriately applied to the inner ring 41, the outer ring 42, and the plurality of rolling bodies 43, which are configured to slide with each other, and to be rotatably supported. The inner ring 41 is a cylindrical shape. The support shaft 24 is fitted to the inner ring 41 to fix and support the inner ring 41. Accordingly, the inner ring 41 does not rotate relative to the support shaft 24.

The outer ring 42 is a cylindrical shape and has a larger diameter than the inner ring 41. The outer ring 42 is disposed radially outwardly of the inner ring 41. Each rolling body 43 is disposed between the inner ring 41 and the outer ring 42.

Rolling bodies 43 are disposed at intervals from each other in the circumferential direction. The inner ring 41 and the outer ring 42 are formed from metal, for example, stainless steel. The outer ring and the guide member 6 are connected via the holding member 5.

The holding member (collar member) 5 comprises a first holding member 51 and a second holding member 52 which are arranged in the axial direction. The first holding member 51 and the second holding member 52 are separate members. The first holding member 51 comprises a first shoulder portion 51a and the second holding member 52 comprises a second shoulder portion 52a. The holding member 5, that is, the first holding member 51 and second holding member 52, are preferably made of synthetic resin. Although not particularly limited thereto, for example, the first holding member 51 and second holding member 52 are formed by POM (polyacetal) resin.

The holding member 5 abuts both ends of the outer perimeter of the outer ring 42. Specifically, the first shoulder portion 51.a and the second shoulder portion 52a of the holding member 5 are formed in a plate shape in the radial direction, the inner perimeter of the first shoulder portion 51a abuts the first end 42a of the outer ring 42, and the inner perimeter of the second shoulder portion 52a abuts the second end 42b of the outer ring 42.

When the first holding member 51 and the second holding member 52 are mounted to the axle bearing member 4, the inner perimeter surfaces of the first holding member 51 and the second holding member 52 engage the outer perimeter surface of the outer ring 42 of the axle bearing member 4, and the first holding member 51 and the second holding member 52 are integrally rotated with the outer ring 42. Since the guide member 6 is coupled with the holding member 5, the guide member 6 is integrally rotated with the holding member 5 and the outer ring 42.

In this manner, the guide member 6 is rotated around the axle bearing member 4. Accordingly, there is a space that leads from the axle bearing member 4 to the guide member 6 (the outer perimeter part thereof, the outer space of the line roller 3) in the periphery of the axle bearing member 4. Seawater, etc., reaching the axle bearing member 4 through this space and entering inside the axle bearing member 4 causes a reduction in the function of the axle bearing member 4. Accordingly, the axle bearing member 4 comprises a grease holding, unit that holds water-repellent grease 10 between the inner ring 41 and the outer ring 42, so that seawater, etc., is less likely to enter inside the axle bearing member 4.

As shown in FIG. 6, at one end of the inner ring 41 (the left side end in FIG. 6), a first grease holding unit forming portion 46A protrudes radially outwardly from the outer perimeter surface of the inner ring 41 in an annular shape. The protruding height of the first grease holding unit forming portion 46A is a height leaving a gap so as to not abut the inner perimeter surface of the outer ring 42. Annular protrusion 46a and protrusion 46b that protrude axially outwardly are respectively formed at a distal end portion and an intermediate portion of the first grease holding unit forming portion 46A. The protrusion 46a and protrusion 46b have annular shapes in which the radial widths are narrower than the first grease holding unit forming portion 46A.

In addition, at one end of the outer ring 42, a second grease holding unit forming portion 47A protrudes radially inwardly from the inner perimeter surface of the outer ring 42 in an annular shape. The protruding height of the second grease holding unit forming portion 47A is a height that leaves a gap so as to not abut the outer perimeter surface of the inner ring 41. The second grease holding unit forming portion 47A is disposed so as to be positioned further axially outwardly than the first grease holding unit forming portion 46A. Annular protrusion 47a and protrusion 47b protrude axially inward and are respectively formed at a distal end portion and an intermediate portion of the second grease holding unit forming portion 47A. The protrusion 47a and protrusion 47b have annular shapes in which the radial widths are narrower than the second grease holding unit forming portion 47A. The first grease holding unit forming portion 46A and the second grease holding unit forming portion 47A are formed from metal or synthetic resin.

The positional relationship between the first grease holding unit forming portion 46A and the second grease holding unit forming portion 47A is a relationship in which the protrusion 47b opposes a recess between the protrusion 46a and the protrusion 46b, and the protrusion 47a opposes a recess between the protrusion 46b and the outer perimeter of the inner ring 41. Conversely, the protrusion 46b opposes a recess between the protrusion 47a and the protrusion 47b, and the protrusion 46a opposes a recess between the protrusion 47b and the inner perimeter of the outer ring 42. However, the distal ends of the protrusions are spaced apart and do not abut each other. As a result, as shown in FIG. 6, the side surfaces of the first grease holding unit forming portion 46A and of the second grease holding unit forming portion 47A are opposed so as to have mutually complementary shapes, and the gap therebetween forms a narrow bent space (a labyrinthine space). Water-repellent grease 10 is held in this gap.

On the other hand, at the other end of the inner ring 41 (the right side end in FIG. 6), a first grease holding unit forming portion 46B protrudes radially outwardly from the outer perimeter surface of the inner ring 41 in an annular shape. Annular protrusions 46c and 46d protrude axially outwardly and are, respectively, formed at a distal end portion and an intermediate portion of the first grease holding unit forming, portion 46B. The protrusion 46c and protrusion 46d have annular shapes in which the radial widths are narrower than the first grease holding unit forming portion 46B.

In addition, at the other end of the outer ring 42, a second grease holding unit forming portion 47B protrudes radially inwardly from the inner perimeter surface of the outer ring 42 in an annular shape. The second grease holding unit forming portion 47B is disposed so as to be positioned further axially outwardly than the first grease holding unit forming portion 46B. Annular protrusions 47c and 47d protrude axially inwardly and are respectively formed at a distal end portion and an intermediate portion of the second grease holding unit forming portion 47B. The protrusion 47c and protrusion 47d have annular shapes in which the radial widths are narrower than the second grease holding unit forming portion 47B. The first grease holding unit forming portion 46B and the second grease holding unit forming portion 47B are formed from metal or synthetic resin.

The positional relationship between the first grease holding unit forming portion 46B and the second grease holding unit forming portion 47B is a relationship in which the protrusion 47d opposes a recess between the protrusions 46c and 46d, and the protrusion 47c opposes a recess between the protrusion 46d and the outer perimeter of the inner ring 41. Conversely, the protrusion 46d opposes the recess between the protrusions 47c and 47d, and the protrusion 46c opposes a recess between the protrusion 476 and the inner perimeter of the outer ring 42. However, the distal ends of the protrusions are spaced apart and do not abut each other. As a result, as shown in FIG. 6, the side surfaces of the first grease holding unit forming portion 46B and of the second grease holding unit forming portion 47B are opposed so as to have mutually complementary shapes, and the gap therebetween forms a narrow bent space (labyrinthine space). Water-repellent grease 10 is held in this gap.

Since the water-repellent grease 10 is held in a narrow bent gap and prepared so as to have a high consistency, the grease will not easily flow out, even if a strong force is applied to the line roller 3, such as centrifugal force. Water-repellent grease 10 does not absorb, but repels water when coming in contact with seawater or river water. Therefore, seawater, etc., that tries to enter inside the axle bearing member 4 is repelled to prevent an intrusion. The water-repellent grease 10 is also applied to the outside surface of the axle bearing member 4 to provide water repellency to the outside surface of the axle bearing member 4.

A well-known water-repellent grease 10 may be used. For example, fluorine grease, silicone grease, and silicon grease may be used. Fluorine grease is obtained by, for example, adding a thickener, such as polytetrafluoroethylene (PTFE), to a fluorine oil having perfluoropolyether as the main component. Silicone grease is obtained by, for example, adding a thickener, such as metal soap, to a silicone oil having polysiloxane as the main component. Silicon grease is obtained by adding a thickener, such as silica fume, to silicone oil.

As shown in FIG. 6, the guide member 6 is a cylindrical shape. In particular, the guide member 6 is a cylindrical member centered on the axis O, with a concavo/convex structure formed so as to stably guide the fishing line thereto, as well as to engage the holding member 5. While not particularly limited thereto, the guide member 6 is, for example, made of metal. For example, the guide member 6 is formed of stainless steel.

The guide member 6 is disposed on the outer perimeter side of the holding member 5, and covers the outer perimeter surface of the holding member 5. That is, the holding member 5 is inserted into the guide member 6. The guide member 6 is engaged with the holding member 5 in a state in which the holding member 5 is inserted into the guide member 6. That is, the guide member 6 is engaged with the holding member 5 so as to not move in the axial direction relative to the holding member 5.

The guide member 6 comprises a guide surface 61 on the outer perimeter which guides the fishing line. Specifically, an annular groove 62 that extends in the circumferential direction is formed on the guide surface 61. In particular, this groove 62 is formed in a position that is further toward the first holding member 51 side than the center of the guide surface 61 in the axial direction. The guide surface 61 is inclined on both ends toward the groove 62 so as to guide the fishing line to the groove 62

In the line roller 3 having the configuration described above, a grease holding unit comprising the first grease holding unit forming portion 46A and the second grease holding unit forming portion 47A, and a grease holding unit comprising the first grease holding unit forming portion 46B and the second grease holding unit forming portion 47B are provided on both ends of the interior of the axle bearing member 4. Water-repellent grease 10 is held in these grease holding units. The gaps in the grease holding units are narrow and bent, having a high ability to hold water-repellent grease 10; therefore, water-repellent grease 10 does not easily flow out. Accordingly, even if seawater, etc., penetrates from outside of the line roller 3 to the periphery of the axle bearing member 4, it is possible to prevent intrusion into the interior of the axle bearing member 4 for a long period of time, and to suppress problems in the axle bearing member 4 caused by seawater, etc.

Further, the first grease holding unit forming portion 46A and the second grease holding unit forming portion 47A do not contact directly. In addition, the first grease holding unit forming portion 46B and the second grease holding unit forming portion 47B do not contact directly. Therefore, the rotation of the axle bearing member 4 is not affected by friction, or the like. Additionally, the problem that the temperature is increased by frictional heat due to contact, and that it becomes easy for the water-repellent grease 10 to flow out due to increased fluidity, does not occur.

Modified Example 1

The first embodiment was described above; however, the grease holding unit formed inside of the axle bearing member 4 is not limited to the shape described above. For example, as shown in FIG. 7A, the first grease holding unit forming portions 46A, 46B may be disposed further axially outwardly than the second grease holding unit forming portions 47A, 47B. In this case, the protrusions 46a, 46b of the first grease holding unit forming portion 46A protrude axially inwardly, the protrusions 47a, 47b of the second grease holding unit forming portion 47A protrude axially outwardly, and the first grease holding unit forming portion 46A and the second grease holding unit forming portion 47A are opposed to each other. Further, the protrusions 46c, 464 of the first grease holding unit forming portion 46B protrude axially inwardly, the protrusions 47c, 47d of the second grease holding unit forming portion 47B protrude axially outwardly, and the first grease holding unit forming portion 46B and the second grease holding unit forming portion 47B are opposed to each other. Water-repellent grease 10 is held in each of the grease holding units formed in this manner. The same effect as in the first embodiment can also be obtained by such a configuration.

Modified Example 2

In addition, as shown in FIG. 7B, an annular first grease holding unit forming portion 48A may protrude radially outwardly from the outer perimeter surface of the inner ring 41, and two second annular grease holding unit forming portions 49A, 49C may protrude radially inwardly from the inner perimeter surface of the outer ring 42 to form the grease holding unit. The protruding heights of the first grease holding unit forming portion 48A and the second grease holding unit forming portions 49A, 49C are heights leaving a gap so as to not abut the outer ring 42 or the inner ring 41 on the opposing side. The first grease holding unit forming portion 48A, is opposed to a recess formed by the two second grease holding, unit forming portions 49A, 49C with a gap therebetween. Water-repellent grease 10 is held in a gap that is bent in a deep U-shape formed in this manner. With this configuration, it is possible to prevent the water-repellent grease 10 from flowing out, especially when centrifugal force acts in a radially outward direction, with a simpler structure than in the first embodiment. The two grease holding unit forming portions 49A, 49C may be formed from one U-shaped member as well.

Modified Example 3

Further, portions of the first holding member 51 and the second holding member 52 may be formed as (a portion of)

the second grease holding unit forming portion 47A. As shown in FIG. 8A, an annular first grease holding unit forming portion 46A protrudes radially outwardly from the outer perimeter surface of the inner ring 41 on the left end side of the axle bearing member 4, and an annular second grease holding unit forming portion 47A protrudes from the inner perimeter surface of the outer ring 42. This is the same structure as shown in FIG. 7A. In this third modified example, a first shoulder portion 51a of the first holding member 51 protrudes radially inward to form a gap with the first grease holding unit forming portion 46A. Water-repellent grease 10 is also held in this gap as well. The right end side of the axle bearing member 4 is formed in the same manner. With this structure, it is possible to further increase the retention force of the water-repellent grease 10 compared to the first modified example shown in FIG. 7A. Meanwhile, the second grease holding unit forming portions 49A, 49B of the second modified example shown in FIG. 7B may be omitted, and the riles thereof be assigned to the first shoulder portion 51a and the second shoulder portion 52a.

Modified Example 4

In the fourth modified example shown in FIG. 8B, the roles of the second grease holding, unit forming portions 47A, 47B in the first embodiment are assigned to the first holding member 51 and the second holding member 52. Specifically, second grease holding unit forming portions 47A, 47B are not formed on the outer ring 42. Instead, the first shoulder portion 51a of the first holding member 51 extends radially inwardly, and two annular protrusions 53a, 53b are formed axially inwardly from the first shoulder portion 51a. The protrusion 53a opposes a recess formed between the protrusion 46b of the first grease holding unit forming portion 46A and the outer perimeter surface of the inner ring 41, and the protrusion 5T opposes a recess formed between the protrusions 46a and 46b of the first grease holding unit forming portion 46A. Similarly, two annular protrusions 54a, 54b are formed axially inwardly from the second shoulder portion 52a that extends radially inwardly. With this structure, it is not necessary to form second grease holding unit forming portions 47A, 47B on the outer ring 42.

In the third and fourth modified example described above, (all or a portion of) the role of the second grease holding unit forming portion is assigned to the first holding member 51 and the second holding member 52. However, the invention is not limited thereto; the role of the first grease holding unit forming portion or of the second grease holding unit forming portion may be assigned to a member abutting the axle bearing member 4 (such as regulating members 44A, 44B) as well. While not shown, for example, portions of the regulating members 44A, 44B may extend radially outwardly, protrusions may be provided if necessary, and combined with the opposing first (or second) grease holding unit forming portion.

Further, in the first embodiment and modified examples 1 to 4 described above, the water-repellent grease 10 may be filled inside of the axle bearing member 4 (between the left and right grease holding units) as well. With this configuration, it is possible to prevent the water-repellent grease 10 of the grease holding unit from flowing out and into the axle bearing member 4, and to further increase the retention force of the water-repellent grease 10. In addition, lubricating grease may be filled between the left and right grease holding units instead of the water-repellent grease. With this configuration, it is possible to further increase the retention force of the water-repellent grease 10, and to further improve the lubricity of the axle bearing member 4 (both not shown).

Second Embodiment

A line roller 3 having a grease holding unit inside of the axle bearing member 4 (first embodiment) was described above. However, the line roller 3 of the present invention is not limited to the embodiment described above. Next, the line roller 3A according to the second embodiment of the present invention will be described using FIG. 9. Members that are common with the first embodiment are given the same reference symbols, and portions that are different from the line roller 3 of the first embodiment will be given focus in the description.

Figure 9:
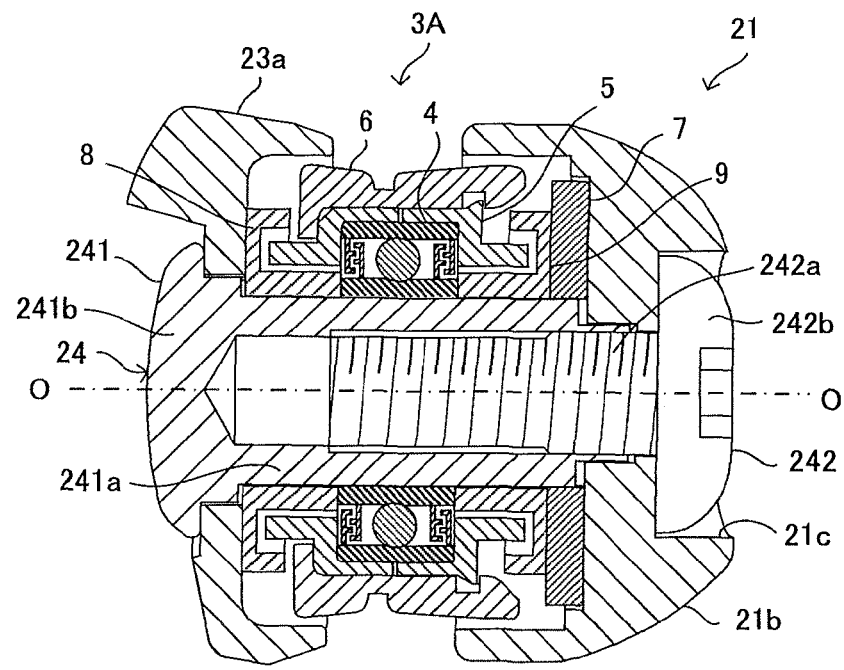
FIG. 9 is a partial, cross-sectional view of the fishing line guiding mechanism according to a second embodiment of the present invention.

As shown in FIG. 9, the line roller 3A comprises an axle bearing member 4, a holding member (collar member) 5, and a guide member 6. Further, the line roller 3A comprises a regulating member 7, a first external grease holding unit forming member 8, and a second external grease holding unit forming member 9.

Figure 10:
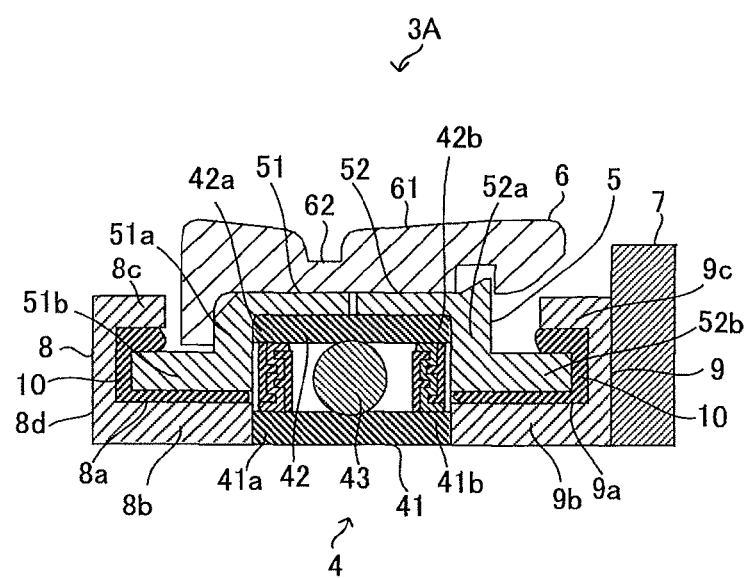
FIG. 10 is an enlarged cross-sectional view of the line roller according to the second embodiment.

As shown in FIG. 10, the first holding member 51 comprises a first seal portion 51b. The first seal portion 51b is an annular protrusion (annular protrusion) that extends axially leftward of the outer ring 42 from the lower end of the first shoulder portion 51a. Similarly, the second holding member 52 comprises a second seal portion 52b. The second seal portion 52b is an annular protrusion (annular protrusion) that extends axially rightward of the outer ring 42 from the lower end of the second shoulder portion 52a. That is, the first seal portion 51b and the second seal portion 52b extend symmetrically in opposite directions on both sides of the axle bearing member 4.

As described above, there is a space that leads from the axle bearing member 4 to the guide member 6 (the outer perimeter part thereof, the outer space of the line roller 3A) in the periphery of the axle bearing member 4. Seawater, etc., reaching the axle bearing member 4 through this space causes a reduction in the function of the axle bearing member 4. Accordingly, so that seawater, etc. does not reach the axle bearing, member 4, this space is made into a narrow passageway (labyrinth), and external grease holding units that hold water-repellent grease 10 are formed in two locations in the passage space on both sides of the axle bearing member 4. The external grease holding units in the two locations are respectively configured from a first external grease holding unit forming member 8 and the first seal portion 51b of the first holding member 51, and a second external grease holding unit forming, member 9 and the second seal portion 521 of the second holding member 52.

The first external grease holding unit forming member 8 is formed from a tubular portion (annular protrusion) 8b that is formed in the circumferential direction, a tubular portion (annular protrusion) 8c that is formed in the circumferential direction at an interval from the tubular portion 8b in the radial direction, and a flat plate portion 8d that connects the tubular portion 8b and the tubular portion 8c in the radial direction. The tubular portion 8c extends from the flat plate portion 8d in the direction of the guide member 6, but is formed so as to not abut the guide member 6. The first external grease holding unit forming member 8 is preferably made of synthetic resin. The first external grease holding unit forming member 8 forms the external grease holding unit along with the first seal portion 51b.

Specifically, the first external grease holding unit forming member 8 comprises an annular depression (annular recess)

8a between the tubular portion 8b and the tubular portion 8c. The depression 8a has a shape that is complementary to the first seal portion 51b of the first holding member 51. The first seal portion 51b is opposed to the depression 8a, but does not abut the flat plate portion 8d. That is, the first seal portion 511 is opposed to the annular recess 8a with a dimension configuration that forms a labyrinthine space (gap) having a U-shaped cross section. Water-repellent grease 10 is held in the space 8a.

Since the water-repellent grease 10 is held in the narrow space 8a and has a high consistency, the grease will not flow out of the end portion of the annular recess 8a on the guide member 6 side.

In addition, the water-repellent grease 10 is also applied to the outside surface of the axle bearing member 4. Since the water-repellent grease 10 does not absorb, but repels seawater, etc, with which it comes into contact, the grease provides water repellency to the outside surface of the axle bearing member 4. Further, since the water-repellent grease 10 is held in the passage space from the outside of the line roller 3A to the axle bearing member 4, it is possible to effectively prevent seawater, etc., that tries to enter from the outside of the line roller 3A, from reaching the outer surface of the axle bearing member 4.

The end portion of the tubular portion 8b on the axle bearing member 4 side abuts the first end 41a of the inner ring 41 of the axle bearing member 4. That is, the first external grease holding unit forming member 8 also plays the role of a regulating member that regulates the position of the axle bearing member 4 from the left in FIG. 10.

The second external grease holding unit forming member 9 made of synthetic resin is disposed on the opposite side of the first external grease holding unit forming member 8 across the axle bearing member 4. The second external grease holding unit forming member 9 is symmetrical with the first external grease holding unit forming member 8 relative to a plane that is perpendicular to the axis O.

The end of the tubular portion 9b of the second external grease holding unit forming member 9 abuts the second end 41b of the inner ring 41 of the axle bearing member 4. Further, a regulating member 7 is disposed to abut the opposite side of the side of the second external grease holding unit forming member 9 that abuts the axle bearing member 4.

In the same way as the first external grease holding unit forming member 8, the second external grease holding unit forming member 9 forms an annular depression (annular recess) 9a from the tubular portion (annular protrusion) 9b and the tubular portion (annular protrusion) 9c. The depression 9a has a shape that is complementary to the second seal portion 52b of the second holding member 52. The second seal portion 52b opposes the annular recess 9a so as to form a labyrinthine space (gap) having a U-shaped cross section. Water-repellent grease 10 is held in this space 9a As described above, the second external grease holding unit forming member 9 forms the external grease holding, unit that holds water-repellent grease 10 along with the second seal portion 52b.

Since the water-repellent grease 10 is held in the narrow space 9a and is prepared to have a high consistency, the grease will not flow out of the end portion of the annular recess 9a on the guide member 6 side.

In addition, the water-repellent grease 10 is also applied to the outside surface of the axle bearing member 4 to provide water repellency to the outside surface of the axle bearing member 4.

Water-repellent grease 10 does not absorb, but repels water when corning in contact with seawater or river water. Accordingly, even if seawater, etc., enters into the narrow passage spaces 8a, 9a, the seawater, etc., is blocked by the water-repellent grease 10 and cannot penetrate further.

In the line roller 3A having the structure described above, an external grease holding unit configured from the first external grease holding unit forming member 8 and the first seal portion 51b is formed in the periphery of the axle bearing member 4, and water-repellent grease 10 is held therein. In addition, an external grease holding, unit formed from the second external grease holding unit forming member 9 and the second seal portion 52b is formed, and water-repellent grease 10 is held therein. Since these external grease holding, units form narrow spaces that are formed in a U-shape, the effect of holding the water-repellent grease 10 is high. Accordingly, it is possible to more effectively prevent seawater, etc., from penetrating to the inside of the axle bearing member 4 from outside of the line roller 3A and to suppress problems in the axle bearing member 4.

Third Embodiment

Line rollers 3 and 3A were described above in which a grease holding unit is disposed on the inside, or on each of the inside and the outside, of one axle bearing member 4, as the first and second embodiments. However, the axle bearing is not limited to one, and may comprise two or more axle bearings. A line roller 3B according to the third embodiment of the present invention comprising two axle bearing members will be described below using FIG. 11. Members that are common with the first embodiment are given the same reference symbols, and portions that are different from the line roller 3 of the first embodiment will be given focus in the description.

Figure 11A:
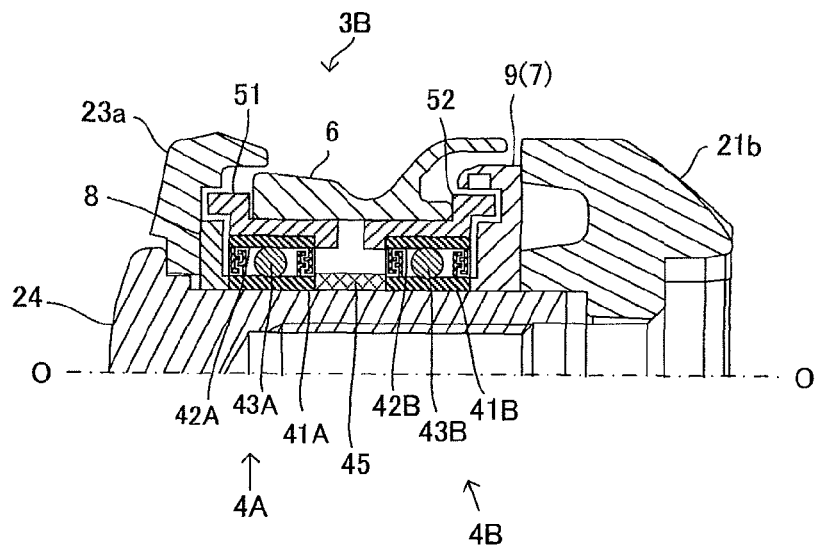
FIG. 11A is a partial cross-sectional view of the fishing line guiding mechanism according to a third embodiment of the present invention.

As shown in FIG. 11A, the line roller 3B comprises two ball bearings (axle bearing member) 4A, 4B on the outer perimeter of the support shaft 24, a regulating member 45, a first external grease holding unit forming member 8, a second external grease holding unit forming member 9, a first holding member (collar member) 51, a second holding member (collar member) 52, and a guide member 6. The axle bearing members 4A, 4B both have the same structure as the axle bearing member 4 of the first embodiment. Water-repellent grease is not shown in FIG. 11A.

Figure 11B:
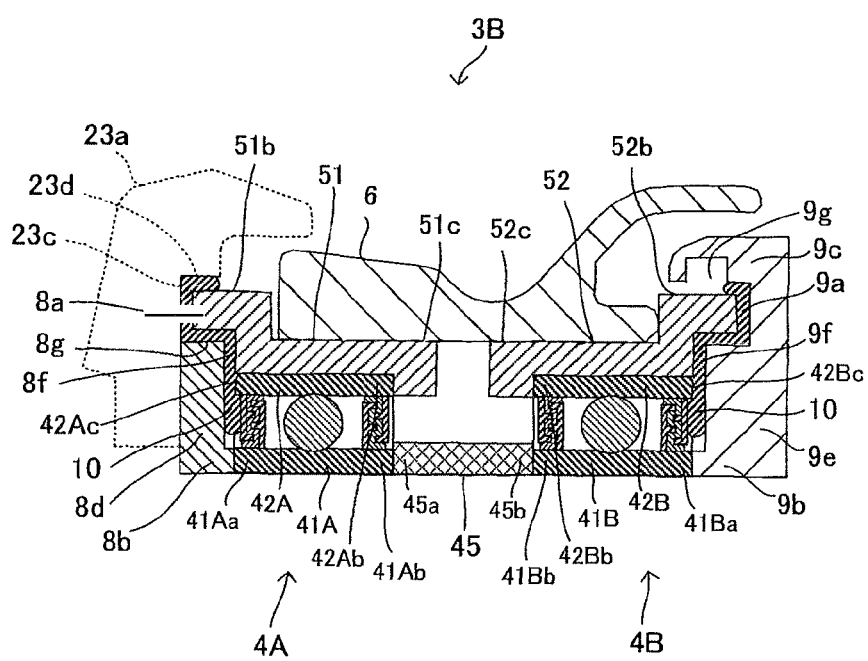
FIG. 11B is an enlarged, cross-sectional view of the line roller thereof.

As shown in FIG. 11B, a first end 41Aa of the inner ring 41A of the axle bearing member 4A abuts the tubular portion 8b of the first external grease holding unit forming member 8. A second end 41Ab of the inner ring 41A abuts the first end 45a of the regulating member 45. A first end 41Ba of the inner ring 41B of the axle bearing member 4B abuts the tubular portion 9b of the second external grease holding unit forming member 9. In addition, a second end 41Bb of the inner ring 41B abuts the second end 45b of the regulating member 45. That is, the positions of axle bearing members 4A, 4B are regulated by the first external grease holding unit forming member 8 and the second external grease holding unit forming member 9 on both sides, and the regulating member 45 in the middle.

The outer perimeter of the outer ring 42A engages the inner perimeter of the first holding member 51. An axially inner end 51c of the first holding member 51 extends radially inwardly, and abuts the second end 42Ab of the outer ring 42A. The end of the first holding member 51 on the opposite side of the end 51c extends from the axially outer end surface of the outer ring 42A in the radial direction, and is further bent outwardly in the axial direction to form an annular protrusion 51*b*.

The outer perimeter of the outer ring 42B is engaged with the inner perimeter of the second holding member 52. An axially inner end 52*c* of the second holding member 52 extends radially inwardly, and abuts the second end 42Bb of the outer ring 42B. The end of the second holding member 52 on the opposite side of the end 52*c* extends from the axially outer end surface of the outer ring 42B in the radial direction, and is further bent outwardly in the axial direction to form an annular protrusion 52*b*.

The inner perimeter of the guide member 6 is engaged with the outer perimeters of the first holding member 51 and the second holding member 52. Accordingly, the guide member 6 is rotated along with the outer rings 42A, 42B of the axle bearing members 4A, 4B via the first holding member 51 and the second holding member 52.

The first external grease holding unit forming member 8 is formed from a tubular portion (annular protrusion) 8*b* that contacts the support shaft 24, and a flat plate portion 8*d* that extends from the tubular portion 8*b* in the radial direction. The axial width of the flat plate portion 8*d* is smaller than the tubular portion 8*b*. Therefore, a space (external grease holding portion) 8*f* is formed between the flat plate portion 8*d* and the first holding member 51 as well as the axle bearing member 4A.

The axially outward end of the first external grease holding, unit forming, member 8 abuts a recess 23*c* that is provided on the inner side of the first end 23*a* of the bail 23. A space (annular recess 8*a*) is formed between the outer perimeter 8*g* of the flat plate portion 8*d* and a wall portion 23*d* of the recess 23*c*. The annular protrusion 51*b* of the first holding member 51 is opposed to this annular recess 8*a* so as to form a space (space formed by the annular recess 8*a* and the annular protrusion 51*b*) 8*a*.

Water-repellent grease 10 is held in the space 8*f* and the space 8*a*. The water-repellent grease 10 that is held in the space 8*f* is held so as to contact the outer side surface 42Ac of the outer ring 42A, to prevent seawater, etc., from reaching the surface of the axle bearing member 4A. While there is a portion in which water-repellent grease 10 is not filled in a part of the left side of the axle bearing member 4A in FIG. 11B, the water-repellent grease 10 may be filled in the entire left side.

The second external grease holding unit forming member 9 includes a tubular portion (annular protrusion) 9*b* that contacts the support shaft 24, and a tubular portion (annular protrusion) 9*c* that is formed at an interval in the radial direction from the tubular portion 9*b*. The space between the tubular portion 9*b* and the tubular portion 9*c* is connected by a flat plate portion 9*e*. A depression (annular recess) 9*a* is formed on the tubular portion 9*c* side of the flat plate portion 9*e*. The annular protrusion 52*b* of the second holding member 52 is opposed to the annular recess 9*a* so as to form a space (space formed by the annular recess 9*a* and the annular protrusion 52*b*) 9*a*. In addition, a space 9*f* (external grease holding portion) is formed between the axle bearing member 4B and the axial surface of the flat plate portion 9*e* excluding the annular recess 9*a*.

Water-repellent grease 10 is held in the space 9*f* and the space 9*a*. The water-repellent grease 10 that is held in the space 9*f* is held so as to contact the outer side surface 42Bc of the outer ring 42B, to prevent seawater, etc., from reaching the surface of the axle bearing member 4B. While there is a portion in which water-repellent grease 10 is not filled in a part of the right side of the axle bearing member 4B in FIG. 11B, the water-repellent grease 10 may be filled in the entire right side.

The tubular portion 9*c* is disposed on the outermost perimeter side of the second external grease holding unit forming member 9, and a grease receiving part 9*g* is formed on the inner perimeter thereof. The water-repellent grease 10 is prepared to have sufficient consistency so as to not flow out under normal use conditions. However, since a strong centrifugal force acts on the line roller 3B in the upward direction in FIG. 11B, it is possible that a portion thereof flows out. The grease receiving part 9*g* is a space for receiving the grease in the unlikely event that the water-repellent grease 10 flows out. Such a grease receiving part 9*g* may be provided on the first external grease holding unit forming member 8 side as well.

The line roller 3B having the structure described above comprises an external grease holding unit in which a narrow, bent space (labyrinth) is brined outside of the axle bearing members 4A, 4B, thereby has a high effect of holding the water-repellent grease 10. Accordingly, it is possible to further prevent seawater, etc., from penetrating to the inside of the axle bearing members 4A, 4B from outside of the line roller 3B, and to suppress problems in the axle bearing members 4A, 4B caused by seawater, etc.

Meanwhile, grease holding units were provided to both the inside and the outside of the two axle bearing, members 4A, 4B in the third embodiment, but the embodiment may be configured to provide grease holding units only to the inside of the two axle bearing members 4A, 4B.

Embodiments that have an external grease holding unit in addition to the grease holding unit inside of the axle bearing member 4 were described above as the second and third embodiments. However, the form of the external grease holding unit is not limited thereto, various modifications such those below are possible.

Modified Example 5

In the second embodiment, the first external grease holding unit forming member 8 and the second external grease holding unit forming member 9 were configured as single annular recessed members. However, the configuration of the first external grease holding unit forming member 8 and the second external grease holding, unit forming, member 9 is not limited thereto, and may be configured by a plurality of members.

Figure 12:
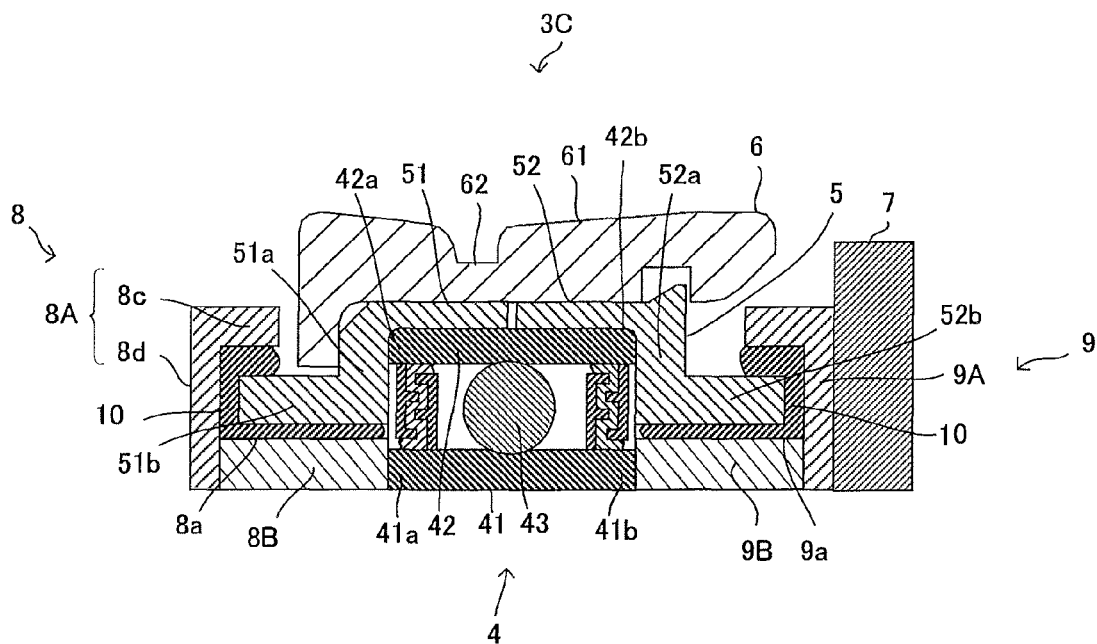
FIG. 12 is an enlarged cross-sectional view of the line roller according to a fifth modified example of the present invention.

As shown in FIG. 12, in a line roller 3C according to the fifth modified example, the annular recess 8*a* of the first external grease holding unit forming member 8 is formed by abutting a tubular member 8B formed in the periphery of the support shaft 24 to a member 8A comprising a tubular portion 8*c* and a flat plate portion 8*d* that extends in the radial direction.

The spacing between the tubular portion 8*c* and the tubular member 8B, and the axial length of the tubular member 8B, are configured to have dimensions in which, when the first seal portion 51*b* is opposed to the annular recess 8*a*, a space (space formed b') the annular recess 8*a* and the first seal portion 51*b*) 8*a* is formed between the two. Water-repellent grease 10 is held in this space 8*a*. Meanwhile, the tubular member 8B also serves as a regulating member that regulates the position of the axle bearing member 4. Further, the second external grease holding unit forming member 9 uses the same configuration. That is, a member 9A and a tubular member 9B are combined to form a space (annular recess 9*a*), which is opposed to the second seal portion 52b, and water-repellent grease 10 is held in the space (space formed by the annular recess 9a and the second seal portion 52b) 9a thereof. The same effect as the second embodiment can also be obtained by such a configuration.

In the fifth modified example, the manufacture of the first external grease holding unit forming member 8 and the second external grease holding unit forming member 9 becomes easier compared to the second embodiment, and it is possible to form an external grease holding unit at a low cost. For example, the member 8A may be manufactured as a pressing member and the tubular member 8B may be manufactured as a cutting member, which can be manufactured at a lower cost than a first external grease holding unit forming member 8 that is formed by integral molding or milling.

Modified Example 6

Figure 13:
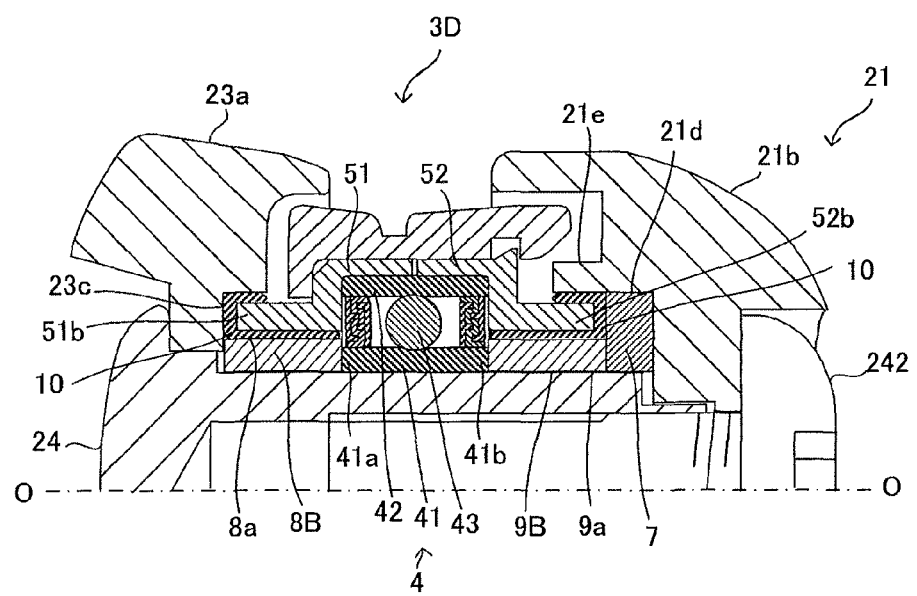
FIG. 13 is an enlarged, cross-sectional view of the line roller according to a sixth modified example of the present invention.

In the line roller 3D according to the sixth modified example, portions of the first end 23a of the bail 23 and the second end 21b of the first bail support member 21 may by combined as the structure of the first external grease holding unit forming member 8 and the second external grease holding unit forming member 9. Specifically, as shown in FIG. 13, a recess 23c is formed on the inner side of the first end 23a of the bail 23. A tubular member 8B is disposed so as to contact the end of the recess 23c. An annular recess 8a is formed between the recess 23c and the outside surface of the tubular member 8B. The first end 23a and the tubular member 8B are configured so that when this annular recess 8a and the first seal portion 51b of the first holding member 51 are opposed, a space (gap) is generated between the two. Water-repellent grease 10 is held in this space.

Further, a projection 21e is formed on the inner side of the second end 21b of the first bail support member 21, and a recess 21d is formed further on the inner side thereof. A regulating member 7 is disposed abutting the side surface of the recess 21d, and a tubular member 9B that is formed contacting, the support shaft. 24 is disposed sandwiched between the regulating member 7 and the inner ring 41 of the axle bearing member 4. The region surrounded by the projection, the regulating member 7; and the tubular member 9B becomes the annular recess 9a. Water-repellent grease 10 is held in the space (gap) that is formed by opposing the annular recess 9a and the second seal portion 52b. The same effect as the second embodiment can also be obtained by such a configuration.

In the sixth modified example, the member 8A and the member 9A can be omitted compared to the fifth modified example by changing a part of the structures of the first end 23a of the bail 23 and the second end 21b of the first bail support member 21, and it is possible to further reduce the manufacturing cost.

Modified Example 7

In the second embodiment, a grease holding unit was configured by forming an annular recess. However, the structure of the external grease holding unit is not limited thereto. For example, one or more annular protrusions (members) may be disposed adjacent to each other with spaces (gap) therebetween in a mutually opposing direction in the axial direction, and the water-repellent grease 10 may be held in this space (not shown).

In the second embodiment, a space (gap) that is bent in a U-shape was formed and the water-repellent grease 10 was held therein; however, it is not necessary for the space to be bent in a U-shape. As described above, the configuration may be such that water-repellent grease 10 is held in a linear space (gap) of the two annular protrusions. In addition, a protruding member and a recessed member, or the like, may be combined so that the space is bent in a crank shape (not shown). In this case as well, a bail member and a bail support member may be used.

Further, in the second and third embodiments, the external grease holding unit is configured by forming an annular protrusion that extends in the rotational shaft direction of the axle bearing member 4 and an annular recess that is depressed in the axial direction. However, the invention is not limited thereto; an annular protrusion and an annular recess may be formed in a direction that is perpendicular to the axial direction (radial direction) and combined (not shown).

Modified Example 8

In the second and the third embodiments, the external grease holding unit is formed by forming an annular recess and an annular protrusion. However, the external grease holding unit is not limited thereto.

Figure 14:
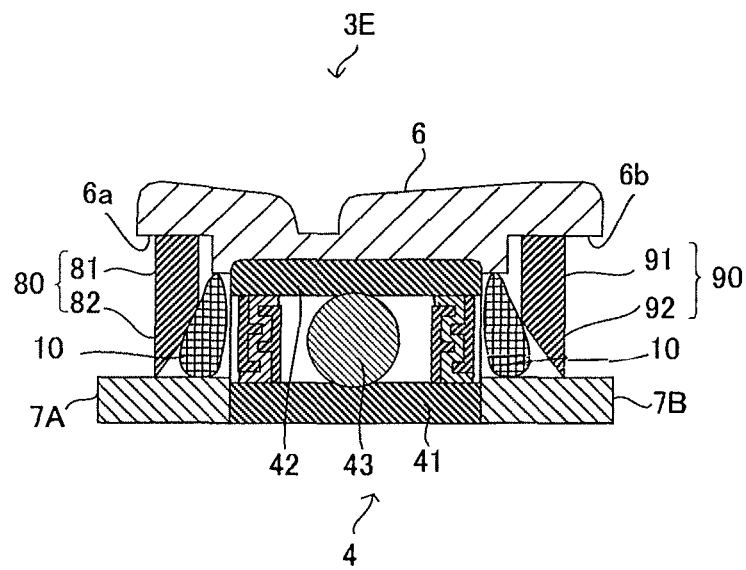
FIG. 14 is an enlarged, cross-sectional view of the line roller according to an eighth modified example of the present invention.

In the line roller 3E according to the eighth modified example shown in FIG. 14, water-repellent grease 10 is held by forming lip seals 80, 90 made of elastic members on both sides of the axle bearing member 4. The lip seals 60, 90 may be formed from synthetic rubber or natural rubber; specifically, from nitrile-butadiene rubber, which is a copolymer of butadiene and acrylonitrile.

The line roller 3E is not provided with a holding member 5 between the guide member 6 and the axle bearing member 4. The lip seal 80 comprises a fixed portion 81 that is fixed to a stepped portion 6a that is formed at one end of the guide member 6, and a lip portion 82 in which the thickness becomes thinner from the fixed portion 81 toward the distal end portion. The lip seal 90 comprises a fixed portion 91 that is fixed to a stepped portion 6b that is formed at the other end of the guide member 6, and a lip portion 92 in which the thickness becomes thinner from the fixed portion 91 toward the distal end portion.

The tips of the lip portions 82, 92 are respectively in contact with regulating members 7A. 7B that regulate the position of the axle bearing member 4. Water-repellent grease 10 is held between the lip seal 80 and the axle bearing member 4, as well as between the lip seal 90 and the axle bearing member 4. It is possible to prevent seawater, etc., from reaching the axle bearing member 4 with this structure.

Meanwhile, the lip portions 82, 92 may be configured to directly contact the support member 24 without providing regulating members 7A, 7B. Further, the lip seals 80, 90 may be formed such that the fixed portions 81, 91 are fixed to the regulating members 7A, 7B (or the support member 24), and that the lip portions 82, 92 are oriented in the direction of the guide member 6. Further, a holding member 5 may be provided, and the lip seals 80, 90 may be fixed to the holding member 5 (both not shown).

Modified Example 9

In the second and third embodiments described above, a grease holding space may be disposed in the external grease holding unit to further improve the holding performance of grease. The ninth modified example in which an external grease holding unit is provided in the line roller 3B according to the third embodiment will be described with reference to FIG. 15.

Figure 15:
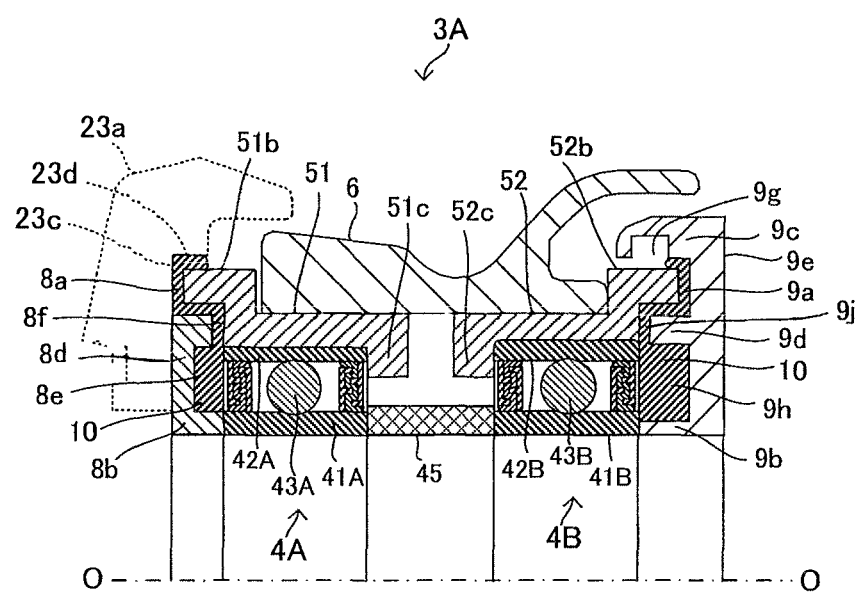
FIG. 15 is an enlarged cross-sectional view of the line roller according to a ninth modified example of the present invention.

As shown in FIG. 15, in the first external grease holding unit forming member 8, a space (external grease holding portion) 8e, which is a depression, is provided in a position in the flat plate portion 8d that faces the outer side surface of the outer ring 42A of the axle bearing member 4A. Water-repellent grease 10 is held in the external grease holding portion 8e, the space 8f, and the space 8a. By providing the external grease holding portion 8e, the retention force of grease with respect to the centrifugal force that acts in the upward direction of the figure is further improved.

In addition, on the second external grease holding unit forming member 9 side as well, a space (external grease holding portion) 9b, which is a depression, is provided in a position of the Step 9d that faces the outer side surface of the outer ring 42B of the axle bearing member 4B. Water-repellent grease 10 is held in the external grease holding portion 9b, the space (external grease holding portion) 9j, and the space 9a. By providing the external grease holding portion 9h, the retention force of grease with respect to the centrifugal force that acts in the upward direction of the figure is further improved.

Modified Example 10

The axle bearing members 4, 4A, 4B shown in the first to the third embodiments and the first to the tenth modified examples may be configured such that the water-repellent grease is filled throughout the interiors of the axle bearing members 4, 4A, and 4B (not shown). In this configuration, it is possible to further suppress the water-repellent grease from flowing out, and to further increase the water repellency of the axle bearing members 4A, 4B.

In addition, lubricating grease may be filled inside the axle bearing members 4, 4A, and 4B instead of water-repellent grease (not shown). While water-repellent grease 10 is held in the grease holding portions of the axle bearing members 4, 4A, and 4B, the water-repellent grease 10 is grease with an emphasis on water repellency for preventing seawater, etc., from entering. Accordingly, by filling grease dedicated to lubrication inside the axle bearing members 4, 4A, and 4B, the lubricity of the line roller can be improved as well.

Additionally, water-repellent grease 10 may be held by applying to the side surface or the outer perimeter surface of the axle bearing members 4, 4A, and 4B as well. In addition, the water-repellent grease 10 may be filled in a portion or across the entirety, from the side surface or the outer perimeter surface of the axle bearing members 4, 4A, and 4B to the inside of the external grease holding unit.

The above-described axle bearing members 4, 4A, and 4B were configured as ball bearings. However, the invention is not limited thereto, as long as the axle bearing member 4 is a robing bearing. For example, the rolling body 43 may be a cylindrical (roller) shape.

The structures of the grease holding units inside and the outside of the axle bearing members 4, 4A, and 4B shown in the above-described first to the third embodiments and the first to the tenth modified examples may be freely combined.

What is claimed is:

1. A line roller for guiding a fishing line to a spool of a spinning reel for fishing, comprising:
a cylindrical guide member comprising a guide surface on an outer perimeter, and configured to guide the fishing line;
an axle bearing member rotatably supporting an inner perimeter surface of the guide member;
a holding member mounted to the axle bearing member; and
a support member supporting the axle bearing member,
the axle bearing member comprising an inner ring supported by the support member, an outer ring configured to be integrally rotated with the guide member, a rolling body disposed between the inner ring and the outer ring, and a grease holding unit holding water-repellent grease between the inner ring and the outer ring.

2. The line roller recited in claim 1, wherein
the grease holding unit comprises
a first grease holding portion protruding radially outwardly from the inner ring, and
a second grease holding portion protruding radially inwardly from the outer ring, and having a side surface opposing a side surface of the first grease holding portion, and
the water-repellent grease being held between the side surface of the first grease holding portion and the side surface of the second grease holding portion.

3. The line roller recited in claim 2, wherein
the grease holding unit is configured such that the side surface of the first grease holding portion and the side surface of the second grease holding portion are opposed and bent in a complementary manner.

4. The line roller recited in claim 2, wherein
the grease holding unit is configured such that the second grease holding portion comprises a recess, the first grease holding portion is inserted in the recess leaving a gap, and the water-repellent grease is held in the gap.

5. The line roller recited in claim 1, further comprising
an external grease holding unit forming a space leading from the axle bearing member to the guide member and holding the water-repellent grease in the space.

6. The line roller recited in claim 5, wherein
the external grease holding unit comprises
a first annular protruding member having an annular protrusion projecting in an axial direction or a radial direction of a rotation of the axle bearing member, and
a second annular protruding member having an annular protrusion projecting adjacent in a direction that opposes the annular protrusion.

7. The line roller recited in claim 5, wherein
the external grease holding unit comprises
an annular protruding member having an annular protrusion projecting in an axial direction or a radial direction of the rotation of the axle bearing member, and
an annular recessed member having an annular recess recessed complementary to the annular protrusion.

8. The line roller recited in claim 1, wherein
the water-repellent grease is filled inside the axle bearing member.

9. The line roller recited in claim 1, wherein
the holding member is disposed between the axle bearing member and the guide member.

10. A line roller for guiding a fishing line to a spool of a spinning reel for fishing, comprising:
a cylindrical guide member comprising a guide surface on an outer perimeter, and configured to guide the fishing line;
an axle bearing member rotatably supporting an inner perimeter surface of the guide member;
a support member supporting the axle bearing member, the axle bearing member comprising an inner ring supported by the support member, an outer ring configured to be integrally rotated with the guide member, a rolling body disposed between the inner ring and the outer ring, and a grease holding unit holding water-repellent grease between the inner ring and the outer ring; and a holding member between the guide member and the outer ring connecting the guide member and the outer ring, a portion of the holding member serving as the second grease holding portion.

11. The line roller recited in claim 10 further comprising
an external grease holding unit that forms a space leading from the axle bearing member to the guide member and holding the water-repellent grease in the space, and a portion of the holding member forms a portion of the external grease holding unit.

12. A line roller for guiding a fishing line to a spool of a spinning reel for fishing, comprising:
   a cylindrical guide member comprising a guide surface on an outer perimeter, and configured to guide the fishing line;
   an axle bearing member rotatably supporting an inner perimeter surface of the guide member;
   a support member supporting the axle bearing member, the axle bearing member comprising an inner ring supported by the support member, an outer ring configured to be integrally rotated with the guide member, a rolling body disposed between the inner ring and the outer ring, and a grease holding unit holding water-repellent grease between the inner ring and the outer ring; and
   an external grease holding unit forming a space leading from the axle bearing member to the guide member and holding the water-repellent grease in the space, the external grease holding unit comprises a seal member made form an elastic member disposed between the guide member and the support member.

13. The line roller recited in claim 12, wherein the seal member comprises
   a fixed portion fixed to one of the guide member and the support member, and
   a lip portion extending from the fixed portion toward the other of the guide member and the support member, and a thickness of a distal end portion of the lip portion being thinner than a thickness of the fixed portion.

14. A line roller for guiding a fishing line to a spool of a spinning reel for fishing, comprising:
   a cylindrical guide member comprising a guide surface on an outer perimeter, and configured to guide the fishing line;
   an axle bearing member rotatably supporting an inner perimeter surface of the guide member;
   a support member supporting the axle bearing member, the axle bearing member comprising an inner ring supported by the support member, an outer ring configured to be integrally rotated with the guide member, a rolling body disposed between the inner ring and the outer ring, and a grease holding unit holding water-repellent grease between the inner ring and the outer ring; and
   an external grease holding unit forming a space leading from the axle bearing member to the guide member and holding the water-repellent grease in the space, the water-repellent grease is held in at least a portion of a space that leads to the guide member and one outer end surface of the axle bearing member in a rotary support shaft direction.

15. A line roller for guiding a fishing line to a spool of a spinning reel for fishing, comprising:
   a cylindrical guide member comprising a guide surface on an outer perimeter, and configured to guide the fishing line;
   an axle bearing member rotatably supporting an inner perimeter surface of the guide member; and
   a support member supporting the axle bearing member, the axle bearing member comprising an inner ring supported by the support member, an outer ring configured to be integrally rotated with the guide member, a rolling body disposed between the inner ring and the outer ring, and a grease holding unit holding water-repellent grease between the inner ring and the outer ring, the water-repellent grease being a first water repellant grease and a second water-repellent grease different from the first water-repellent grease is filled inside the axle bearing member.

* * * * *